United States Patent
Varekamp et al.

(10) Patent No.: US 11,228,704 B2
(45) Date of Patent: Jan. 18, 2022

(54) APPARATUS AND METHOD OF IMAGE CAPTURE

(71) Applicant: KONINKLIJKE PHILIPS N.V., Eindhoven (NL)

(72) Inventors: Christiaan Varekamp, Veldhoven (NL); Bartholomeus Wilhelmus Sonneveldt, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/768,944

(22) PCT Filed: Nov. 30, 2018

(86) PCT No.: PCT/EP2018/083080
§ 371 (c)(1),
(2) Date: Jun. 2, 2020

(87) PCT Pub. No.: WO2019/110431
PCT Pub. Date: Jun. 13, 2019

(65) Prior Publication Data
US 2021/0127057 A1 Apr. 29, 2021

(51) Int. Cl.
*H04N 5/232* (2006.01)
*G06T 7/70* (2017.01)

(52) U.S. Cl.
CPC .......... *H04N 5/23222* (2013.01); *G06T 7/70* (2017.01); *H04N 5/232939* (2018.08); *G06T 2207/30244* (2013.01)

(58) Field of Classification Search
CPC ......... H04N 5/23222; H04N 5/232939; H04N 13/282; G06T 7/70; G06T 2207/30244
See application file for complete search history.

(56) References Cited

U.S. PATENT DOCUMENTS 9,338,440 B2 * 5/2016 Li ..................... H04N 5/23206
9,667,873 B2 * 5/2017 Mulloni ................... G06T 7/80
(Continued)

FOREIGN PATENT DOCUMENTS

| GN | 104159038 A | 11/2014 |
| GN | 101709961 A | 5/2020 |
| JP | 2017194857 A | 10/2017 |

OTHER PUBLICATIONS

"Top 5 Best Panorama Photography for Android" Electrodealpro, Apr. 27, 2020.
(Continued)

*Primary Examiner* — John Villecco (57) ABSTRACT

An image capturing apparatus comprises a capture unit (101) for capturing images of a scene. A tracker (103) dynamically determines poses of the capture unit and a pose processor (105) determines a current pose of the capture unit (101) relative to a set of desired capture poses. The pose may include a position and orientation of the capture unit (101). A display controller (107) is coupled to the pose processor (105) and is arranged to control a display to present a current capture pose indication, the current capture pose indication comprising an indication of a position of the current pose of the capture unit (101) relative to the set of desired capture poses in a direction outside an image plane of capture unit (101). In some embodiments, the set of desired capture poses may be adaptively updated in response to data captured for the scene.

20 Claims, 4 Drawing Sheets (56) References Cited

U.S. PATENT DOCUMENTS

| | | | |
|---|---|---|---|
| 9,716,826 B2* | 7/2017 | Wu | H04N 13/211 |
| 9,813,621 B2* | 11/2017 | Anderson | G02B 27/017 |
| 9,906,773 B2* | 2/2018 | Kim | G06T 7/55 |
| 9,912,862 B2* | 3/2018 | Peruch | G01B 11/24 |
| 9,934,608 B2* | 4/2018 | Castillo | G06T 19/20 |
| 9,965,471 B2* | 5/2018 | Huston | G06T 19/20 |
| 9,998,655 B2* | 6/2018 | Scharl | H04N 5/232945 |
| 10,015,393 B2* | 7/2018 | Sakurai | H04N 5/232945 |
| 10,038,838 B2* | 7/2018 | Castillo | H04N 5/23222 |
| 10,171,730 B2* | 1/2019 | Kobayashi | H04N 5/23222 |
| 10,178,303 B2* | 1/2019 | Castillo | H04N 5/232941 |
| 10,334,165 B2* | 6/2019 | Anderson | H04N 13/221 |
| 10,341,568 B2* | 7/2019 | Fischler | H04N 5/23222 |
| 10,410,413 B2* | 9/2019 | Upendran | H04N 5/23293 |
| 10,681,264 B2* | 6/2020 | Castillo | H04N 5/23222 |
| 10,713,828 B2* | 7/2020 | Hiraga | G06T 11/60 |
| 10,785,406 B2* | 9/2020 | Lanka | H04N 5/23299 |
| 10,803,658 B2* | 10/2020 | Upendran | G06T 17/05 |
| 2012/0105599 A1* | 5/2012 | Lin | H04N 13/211 348/50 |
| 2013/0107020 A1* | 5/2013 | Hashimoto | H04N 5/23222 348/50 |
| 2013/0329014 A1* | 12/2013 | Obata | H04N 13/204 348/46 |
| 2014/0009586 A1 | 1/2014 | Mcnamer et al. | |
| 2014/0267593 A1* | 9/2014 | Kim | H04N 5/23206 348/36 |
| 2014/0300775 A1 | 10/2014 | Fan et al. | |
| 2014/0368620 A1* | 12/2014 | Li | H04N 5/232935 348/50 |
| 2015/0103149 A1 | 4/2015 | McNamer et al. | |
| 2016/0005211 A1* | 1/2016 | Sarkis | G06T 1/0007 345/419 |
| 2017/0034431 A1* | 2/2017 | Malgimani | H04N 5/23222 |
| 2018/0103209 A1* | 4/2018 | Fischler | H04N 13/221 |
| 2019/0289199 A1* | 9/2019 | Piramuthu | G06T 11/60 |
| 2020/0143565 A1* | 5/2020 | Festa | G06T 7/75 |
| 2020/0260000 A1* | 8/2020 | Castillo | H04N 1/2104 |

OTHER PUBLICATIONS

F. Buckell "5 of the Best Panorama Apps for Android that take Stunning Photos" Make Tech Easier May 7, 2019.
International Search Report and Written Opinion from PCT/EP2018/083080 dated Apr. 9, 2019.

* cited by examiner

APPARATUS AND METHOD OF IMAGE CAPTURE

CROSS-REFERENCE TO PRIOR APPLICATIONS

This application is the U.S. National Phase application under 35 U.S.C. § 371 of International Application No. PCT/EP2018/083080, filed on Nov. 30, 2018, which claims the benefit of EP Patent Application No. EP 17205488.4, filed on Dec. 5, 2017. These applications are hereby incorporated by reference herein.

FIELD OF THE INVENTION

The invention relates to capturing of images of a scene and in particular, but not exclusively, to capturing of images providing a three-dimensional representation of the scene.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and "look around" in the scene being presented.

Such a feature can specifically enable a virtual reality experience being provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications for computers and consoles, such as in the game category of first person shooters.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

In order to support many such new applications and services, it is desirable that a scene can be accurately captured. In contrast to traditional applications in which a single viewport for a single viewpoint is typically sufficient (e.g. traditional video sequences), it is desirable if the full 3D information in the scene can be accurately captured.

For example, with 6DoF (six degrees of freedom, corresponding to three degrees of freedom for the position of the viewpoint and three degrees of freedom for the orientation) virtual reality capture, a scene is typically captured from multiple positions in multiple directions in order to capture accurate and complete information about the whole scene. During playback of 6DoF content from such a capture, a viewer can in typical applications freely move within the scene with views dynamically being synthesized to correspond to the current virtual pose of the viewer. The presented views may e.g. be interpolated views synthesized from the originally captured views using suitable algorithms. This enables smooth transitions and/or reduces the required amount of captured light field data. Typically for such view interpolation, depth information is used for the synthesis with the depth information typically being captured directly or estimated from stereo images. Another example may be to use the captured views to develop a three-dimensional model of the scene.

In many applications, a static scene may be captured by moving a handheld camera. After the capture, the camera positions and viewing directions for the captured images are derived and used as base images for view synthesis or to generate a three-dimensional model for the scene.

However, in order for such a representation based on captured images to be sufficiently accurate, it is necessary that a sufficient amount of relevant information is captured by the images. This tends to require a relatively high spatial capture frequency/density and in practice it has been found that users typically under sample space or angle with the result that any virtual cameras are not ideally positioned. This can have significant implications. For example, consecutive processing steps, such as orientation refinement, can fail in regions where not enough camera positions were captured.

The problems of such a capture approach include:
1. It is difficult to position a handheld camera such that the resulting light-field is sufficiently densely sampled spatially (and in all directions).
2. It is difficult to determine a priori what the camera scanning pattern is for e.g. optimal 6DoF playback as this depends closely on the properties of the individual scene.

A solution is to exhaustively capture substantially all possible view locations and directions. However, doing so manually, (or even using an automated moving system, such as a driving robot) especially using a handheld camera system, is at best very time-consuming and typically impractical, and it is typically impossible to guarantee that all intended positions and orientations are captured.

Moreover, redundant views will be captured that need to be removed or compressed later in order to ensure that the data storage, distribution, and processing resource requirements do not become excessive.

Using a robot and/or dedicated multi-camera rig may address some of these problems. However, such an approach tends to be costly, be cumbersome, require complex equipment to be available and set-up etc. A multi-camera rig may also introduce the problem of self-occlusions, i.e. cameras obscure each other's view of the scene.

In order to address the problems in manual image capture, it has been proposed to overlay the image with graphic symbols which indicates how the orientation of the camera should be changed between different captures. For example, mobile phone capture applications used for e.g. panoramic shots have been developed that show on the display how the camera should be rotated to capture a plurality of images which may then be stitched together to expand the effective viewing angle of the camera. However, such an approach still results in a suboptimal capture of a scene and is typically unsuitable for more complex applications, such as when accurate three-dimensional information is required in order to build a model of the scene.

Hence, an improved image capture system and approach would be advantageous. In particular, an approach that allows improved operation, facilitated capture, improved representation of a scene, increased flexibility, facilitated implementation, facilitated operation, reduced data storage, distribution, and processing resource requirements, improved adaptability, and/or improved performance would be advantageous.

US2014/0300775A1 discloses an approach for processing one or more images to determine camera location information and/or camera pose information. The document discloses an application wherein a User Equipment may display guidance to the user in the form of a route from a current position to a favourite spot for taking a photo.

SUMMARY OF THE INVENTION

Accordingly, the Invention seeks to preferably mitigate, alleviate or eliminate one or more of the above mentioned disadvantages singly or in any combination.

According to an aspect of the invention there is provided an image capturing apparatus comprising: a capture unit for capturing images of a scene; a tracker for dynamically determining poses of the capture unit; a pose processor for determining a current pose of the capture unit relative to a set of desired capture poses; a display; a display controller coupled to the pose processor for controlling the display to present a current capture pose indication, the current capture pose indication comprising an indication of a position of the current pose of the capture unit relative to the set of desired capture poses in a direction outside an image plane of capture unit; and a capture processor arranged to determine at least some of the captures poses of the set of desired capture poses in response to data captured for the scene.

The approach may facilitate, allow, and/or support an improved capture of a scene, and in particular a capture operation seeking to capture a three-dimensional representation of a scene. The approach may in many scenarios result in improved capture data being generated by a simpler and less cumbersome capture operation and process.

The image capturing apparatus may provide an output indication which more accurately reflects how a physical scene is captured to provide enhanced data for e.g. view synthesis or a development of a model for the scene. The indication may reflect a movement or orientation required for the capture unit 101 in order to perform an acceptable or desirable capture of a real-world scene. The indication may be provided in any suitable form and e.g. different visual indications may be used in different embodiments.

The indication of the position outside of the image plane may specifically be an indication in the depth or z-direction of a camera of the capture unit. The indication may indicate a relative position that includes a component in a direction perpendicular to the image plane of the camera. The indication of the position outside of the image plane is thus not merely an indication of a relative position parallel to (or in) the image plane, and is not merely an indication of a rotation. The image capturing apparatus may provide a relative position indication which corresponds to a direction that is not merely a sideways image plane translation or a rotation of a camera of the capture unit. The indication of the position outside of the image plane may specifically provide an indication of a forwards or backwards movement required of the capture unit/camera in order for this to spatially coincide with a pose of the set of desired capture poses. In many applications, the display controller may in addition to controlling the display to present the indication of the position outside of the image plane also control it to provide an indication of a relative position within the image plane and/or an indication of an orientation of the current pose relative to the set of desired capture poses.

The set of desired capture poses may specifically correspond to a set of poses determined or estimated to achieve an acceptable capture of the scene. The set of desired capture poses may in some applications be predetermined and may in other applications be adapted to the specific scene characteristics.

The display controller may be arranged to control the display to present the indication by generating a video or similar display signal which is presented by the display. The video signal may be generated to comprise images showing the current capture pose indication. The video signal may in many applications also include the images currently being captured by the capture unit, and thus the display may also show images of the scene as captured by the capture unit.

The display may be a conventional two-dimensional display, or may e.g. be a three-dimensional display.

In some embodiments, the indication of the position of the current pose of the capture unit relative to the set of desired capture poses comprises a two-dimensional or three-dimensional position indication.

The set of desired capture poses may be adapted depending on properties of the scene and this may allow improved capture operations in many situations and applications.

The data may specifically be light field data (images) and/or depth data (e.g. a depth map). In some embodiments, the capture processor may be arranged to determine the set of desired capture poses in response to images captured at one or more poses. In some embodiments, the capture processor is arranged to determine the set of desired capture poses in response to depth data captured at one or more poses in the scene. In some such embodiments, the depth data may be determined or derived from images captured at slightly different viewpoints (e.g. from stereo images).

The data may be captured for one or more poses in the scene. The data (or at least some of it) may specifically be captured for a number of poses belonging to the set of desired capture poses (e.g. in an original nominal set of desired capture poses which is subsequently modified in dependence on the captured data).

In some embodiments, the capture processor may be arranged to vary a spatial density of desired capture poses in a neighborhood of a first pose in response to an image captured at the first pose being indicative of an increased texture variation.

In accordance with an optional feature of the invention, the current capture pose indication comprises an indication of an orientation of the capture unit relative to the set of desired capture poses.

This may in many embodiments and scenarios provide improved and/or facilitated operation and/or implementation. In many applications, it may result in improved capture of a scene.

In accordance with an optional feature of the invention, the display is a three-dimensional display, and the current capture pose indication is a three-dimensional indication of a direction to a pose of the set of desired capture poses.

This may in many embodiments provide an improved indication of the underlying relationship between the current pose and the desired capture operation.

In accordance with an optional feature of the invention, the display is a display of an augmented reality headset, and the current capture pose indication is indicative of a position of a desired capture pose relative to a position of the current pose.

This may in many embodiments provide an improved indication of the underlying relationship between the current pose and the desired capture operation. The augmented reality headset may for example be a virtual reality headset or augmented reality glasses.

In accordance with an optional feature of the invention, the capture unit is comprised in a handheld device.

The invention may allow substantially improved and/or facilitated capture of a scene using a handheld apparatus, such as a handheld still or video camera, for capturing a scene. The approach may e.g. make it practical for a non-expert to accurately capture complex scenes using only e.g. a handheld device, such as a Smartphone.

In accordance with an optional feature of the invention, the capture processor is arranged to vary a spatial density of desired capture poses in a neighborhood of a first pose in response to data captured at the first pose.

This may in many embodiments and scenarios provide improved and/or facilitated operation and/or implementation. In many applications, it may result in improved capture of a scene.

In accordance with an optional feature of the invention, the capture processor is arranged to increase the spatial density of desired capture poses in the neighborhood of the first pose in response to data captured at the first pose being indicative of an increasing depth variation.

This may in many embodiments and scenarios provide improved and/or facilitated operation and/or implementation. In many applications, it may result in improved capture of a scene.

In some embodiments, the capture processor may be arranged to decrease the spatial density of desired capture poses in the neighborhood of the first pose in response to data captured at the first pose being indicative of a decreasing depth variation.

In accordance with an optional feature of the invention, the capture processor is arranged to increase the spatial density of desired capture poses in the neighborhood of the first pose in response to data captured at the first pose being indicative of a reduced distance to an object of the scene.

This may in many embodiments and scenarios provide improved and/or facilitated operation and/or implementation. In many applications, it may result in improved capture of a scene.

In some embodiments, the capture processor may be arranged to decrease the spatial density of desired capture poses in the neighborhood of the first pose in response to data captured at the first pose being indicative of an increased distance to an object of the scene.

In accordance with an optional feature of the invention, the capture processor is arranged to increase the spatial density of desired capture poses in the neighborhood of the first pose in response to data captured at the first pose being indicative of an increased roughness of a surface of an object of the scene.

This may in many embodiments and scenarios provide improved and/or facilitated operation and/or implementation. In many applications, it may result in an improved capture of a scene.

In some embodiments, the capture processor may be arranged to decrease the density of desired capture poses in the neighborhood of the first pose in response to data captured at the first pose being indicative of a decreased roughness of a surface of an object of the scene.

In accordance with an optional feature of the invention, the data includes depth data.

In accordance with an optional feature of the invention, the capture processor is arranged to increase a spatial density of desired capture poses in a neighborhood of a first pose of the number of poses by adding at least one desired capture pose to a predetermined set of desired capture poses in the neighborhood.

This may provide an effective and low complexity adaptation of the set of desired capture poses.

In some embodiments, the capture processor may be arranged to decrease a spatial density of desired capture poses in a neighborhood of a first pose by removing at least one desired capture pose of a predetermined set of desired capture poses in the neighborhood.

In accordance with an optional feature of the invention, the display controller is arranged to control the display to present the current capture pose indication without displaying images currently captured by the capture unit.

According to an aspect of the invention there is provided a method of image capturing comprising: dynamically determining poses of a capture unit capable of capturing images of a scene; determining a current pose of the capture unit relative to a set of desired capture poses; controlling a display to present a current capture pose indication, the current capture pose indication comprising an indication of a position of the current pose of the capture unit relative to the set of desired capture poses in a direction outside an image plane of the capture unit; the capture unit capturing images of a scene; and determining at least some of the capture poses of the set of desired capture poses in response to data captured for the scene.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a handheld image capture system and approach but it will be appreciated that the invention is not limited to such an application but may be applied to many other image capture systems.

Figure 1:
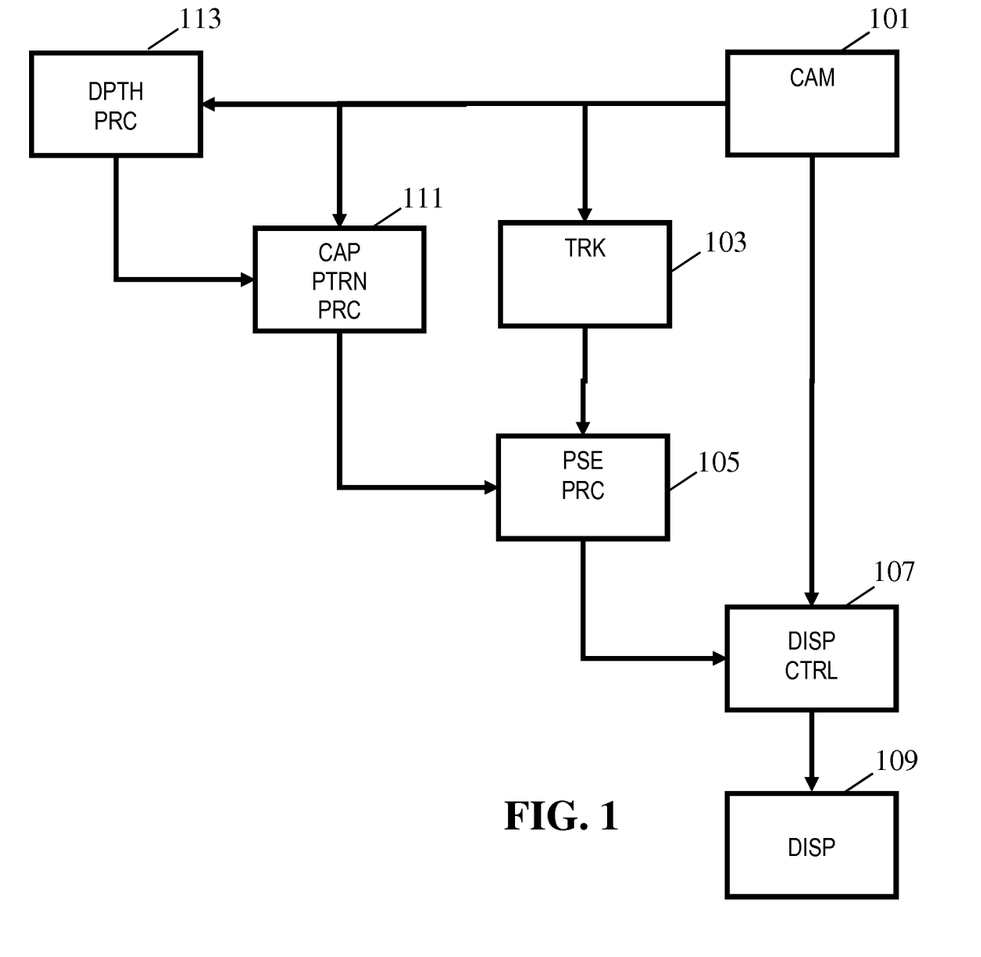
FIG. 1 illustrates an example of elements of an image capturing apparatus in accordance with some embodiments of the invention.

FIG. 1 illustrates an example of an image capturing apparatus in accordance with some embodiments of the invention. The image capturing apparatus may for example be used to capture 3D scenes such that a detailed representation or model can be generated for the scene, for example for use in virtual reality applications. In order to do so, it is typically necessary to capture the scene from many different positions and in many different directions, i.e. captures for a large number of poses is required. However, this tends to be very cumbersome and time consuming and require substantial effort. Such disadvantages may be reduced if the selection of capture poses is optimized, e.g. by removing redundancy between captures and ensuring that the required coverage for the scene is achieved with fewer captures. In some scenarios, this may be achieved by careful planning and manual organization of the capture. However, in many scenarios and applications, this is not practical, such as, for example, if the capture of a scene is intended to be by the general consumer using a handheld device, such as a smartphone.

The image capturing apparatus of FIG. 1 may assist the capture process by providing feedback on suitable capture poses for a given scene thereby directing a user towards capturing from advantageous poses. This feedback may in many scenarios provide improved overall capturing of a scene based on fewer captures as the user is directed towards capture poses providing improved capture data for the scene.

The image capturing apparatus comprises a capture unit 101 which typically may comprise a camera that captures the scene. The camera may typically be a conventional camera or may e.g. be a stereo camera. The capture unit is arranged to capture (light field) images of the scene and may in some embodiments also capture depth information (e.g. by stereo images deducing depth from disparity or dedicated depth information, such as z-values determined by direct depth measurement (e.g. using a depth ranging camera)).

The camera unit is coupled to a tracker 103 which is arranged to determine the pose of the capture unit. Thus, the pose for the camera capturing images of the scene is determined by the tracker 103. This may for a given time instant measure/estimate the pose of the capture unit corresponding to the viewpoint pose for an image captured at that time instant.

In the field, the terms placement or a pose is used as a common term for position and/or direction/orientation. The combination of the position and direction/orientation of e.g. an object, a camera, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following the term pose is used to refer to a position and/or orientation which may represented by one to six values (corresponding to the maximum possible degrees of freedom). The description will focus on embodiments and examples where a pose has the maximum degrees of freedom, i.e. three degrees of freedom of each of the position and the orientation resulting in a total of six degrees of freedom. The pose may thus be represented by a set or vector of six values representing the six degrees of freedom and thus the pose vector may provide a three-dimensional position and/or a three-dimensional direction indication. However, it will be appreciated that in other embodiments, the pose may be represented by fewer values.

In the example, the tracker 103 is arranged to dynamically determine the pose of the viewpoint of the camera of the capture unit 101 and it may continuously determine the current pose during a capture operation (or possibly only in intervals of such an operation). The capture unit 101 may specifically determine a six value pose vector reflecting the current pose.

The exact determination of the pose of the capture unit 101, and typically of a camera of the capture unit, will depend on the specific preferences and requirements of the individual embodiment. In many embodiments, the capture unit 101 may include accelerometers etc. that allow both position and orientation of a device comprising the capture unit 101 to be tracked, or more specifically which allow the camera of the capture unit 101 to be tracked (typically the pose of the camera is tracked by tracking a device in which the capture unit 101 is implemented). For example, the capture unit 101 may be implemented in a smartphone and the built-in location functionality (e.g. GPS based), accelerometers, etc. may be used to determine the position and orientation of the smartphone and thus of the camera viewpoint (view position and view orientation). In many embodiments the tracker 103 is not a separate device but is part of the same device as the capture unit 101, and indeed in many embodiments the entire image capturing apparatus of FIG. 1 may be implemented in a single device. In many typical embodiments, determining pose in real-time may be achieved on the basis of feature points detected in stereo camera images or image+depth sensor. Other sensors (e.g. accelerometer, gyro, magnetic sensor) may help in a sensor fusion approach.

It will for example be appreciated that in many embodiments, the tracker 101 is arranged to determine the current pose at least partially based on previous poses, for example by applying a low pass filtering to the determined measurements or estimates. However, in some embodiments, the current pose may be determined based exclusively on the current properties and there may be no operation performed to correlate the current determined pose with previous (or future) poses.

The tracker 103 is coupled to a pose processor 105 which is arranged to compare the current pose indicated by the tracker 103 to a set of desired capture poses. In the example, the pose processor 105 is coupled to a capture processor 111 which provides the set of desired capture poses to the pose processor 105. In some embodiments, the capture processor 111 may be arranged to provide the whole set of desired capture poses to the pose processor 105 at the same time, and specifically in many embodiments at the start of the capture operation. In other embodiments, the set of desired capture poses may be provided gradually, e.g. one at a time with the capture processor 111 providing only the next desired capture pose once a capture has been executed for the previous pose. Similarly, in some embodiments and scenarios, the set of desired capture poses may be a predetermined set of capture poses whereas in other embodiments it may be determined dynamically during the capture process. For example, in some embodiments, the capture processor 111 may at the start of a capture process provide a full set of desired capture poses corresponding to a predetermined capture pattern. In other embodiments, the capture processor 111 may be arranged to adaptively determine the next desired capture pose based on the previous poses, and specifically based on the capture results from the previous poses, and thus the capture processor 111 may dynamically determine the next capture pose based on the previous operation.

The pose processor 105 is arranged to determine the current pose relative to the set of desired capture poses. In many embodiments, the set of desired capture poses from the second processor 309 and the current pose from the tracker 103 may be provided in the same coordinate system and thus the current pose can easily be compared to set of desired capture poses. In other embodiments, the pose processor 105 may be arranged to perform a coordinate transformation or otherwise compensate for differences in the reference coordinate systems for the current pose and the set of desired capture poses.

The pose processor 105 is coupled to a display controller 107 which is arranged to control a display 109. The pose processor 105 provide data to the display controller 107 reflecting the current pose with respect to the set of desired capture poses and in response the display controller 107 controls the display to present a current capture pose indication which is indicative of the current pose of the capture unit relative to the set of desired capture poses, and specifically is indicative of position of the current pose of the capture unit relative to the set of desired capture poses. The system accordingly controls the display to provide an indication to a user of the current camera pose relative to a desired capture pose, thereby directing the user towards the next suitable capture pose. This enables the user to move the capture unit 101 such that captures are generated for the poses comprised in the set of desired capture poses, thereby providing an improved capture for a reduced effort.

It will be appreciated that the pose processor 105 may provide different data indicative of the current pose relative to the set of desired capture poses in different embodiments. Similarly, it will be appreciated that the processing of the data and the control of the display will be different in different embodiments, and specifically that the display may be controlled to provide different indications of the current pose relative to the set of desired capture poses in different embodiments.

For example, in some embodiments, the pose processor 105 may evaluate the current pose, the set of desired capture poses, and the previous capture operation to determine the nearest desired capture pose to the current pose. It may then determine a pose differential indicative of the change in pose required to change the capture unit 101 from the current pose to the next desired pose, for example simply by subtracting the two appropriate pose vectors from each other to result in difference pose vector. This pose vector may then be provided to the display controller 107.

The display controller 107 may e.g. generate a video signal for the display in which the frames/images consist in or include a graphic representation of the difference vector. The graphic representation may for example, if the display is a 3D display, comprise two three-dimensional arrows with one pointing in the direction to move the capture unit 101 and the other arrow indicating the required rotation (change in orientation). For a two-dimensional display, the 3D indication may e.g. be provided by the arrow being represented by a projection on to a representation of image of the scene, or e.g. two arrows may be used for each of the position and location indications. As another example, the display controller 107 may simply control the display to directly display the component values of the difference vector.

As another example, in some embodiments, the pose processor 105 may provide data to the display controller 107 individually describing the current pose and the set of desired capture poses (e.g. referred to the same coordinate system) and the display controller 107 may proceed to display a representation of the three dimensional positions of the set of desired capture poses and the three-dimensional position of the current pose. In addition, for each presented desired capture pose, an arrow may be included showing the desired orientation relative to the current orientation. For a two-dimensional display, three-dimensional information may e.g. be provided by a projection onto the scene if this is displayed, or e.g. may be achieved by including a plurality of indicators for each capture pose.

The image capturing apparatus is arranged to generate the indication of the current pose relative to the set of desired capture poses to include an indication of the position of the current pose of the capture unit relative to the set of desired capture poses in a direction outside an image plane of capture unit. The capture unit 101 is arranged to capture an image of the scene and this image may specifically be a two-dimensional image having an image plane corresponding to a projection of the three-dimensional scene onto the two-dimensional image. For example, a conventional camera captures a two-dimensional image and a capture unit 101 comprising such a camera inherently captures a two-dimensional image and has a corresponding two-dimensional image plane. The two-dimensional image plane is typically given by a two-dimensional image sensor, such as a CCD sensor, on which the scene is projected.

Conventional capture of scenes is typically based on such two-dimensional images with the process of capturing being based on the two-dimensional nature of the captured images.

For example, some conventional capture operations include generating a combined image by combining a plurality of typically overlapping images. For example, panoramic pictures may be created by taking a picture in one direction, moving the camera to one side, or possibly rotating the camera, taking another picture etc. Software may then be used to combine the images to generate a panoramic picture. In some cases, such applications may include an indication that the user should move the camera to the left or to the right to capture the next image. A feedback to the user may be provided which shows how the current image area in the image plane is extended by shifting the image area in the image plane to increase the area covered beyond that which is possible with the viewing angle of the specific camera.

Such conventional approaches essentially operate in the two-dimensional plane and simply seeks to increase the effective viewing angle of the camera.

In the system of FIG. 1, the display controller 107 is arranged to generate an indication which includes an indication of a position of the current pose of the capture unit relative to (one or more positions) of the set of desired capture poses in a direction outside an image plane of capture unit. The indication may accordingly provide information on how the capture unit 101 should be moved forward or backwards (with respect to the image plane) and order to reach a desired capture pose, and specifically a desired capture position. The approach may be used to provide feedback and guidance to a user which allows a full three-dimensional capture of the scene based on captures that are not limited to a two-dimensional plane (specifically the image plane) but which utilizes a capture approach that considers the full extent of the scene. It can be considered that the approach provides a scene based capture where desired capture positions in the scene can be identified with the viewer being directed to these capture positions rather than merely use a viewer based capture approach wherein the user is guided to shift a viewpoint position or orientation to extend captured area of a two-dimensional view plane. In contrast to conventional approaches directed at increasing the effective viewing angle/area of the image plane covered, the image capturing apparatus of FIG. 1 is directed towards capturing data to more accurately represent a scene, and in particular to represent three dimensional characteristics of the scene.

The system of FIG. 1 is thus arranged to guide the user and provide feedback that is not merely an indication of how the image plane capture area can be extended but rather provides information to the user that allows him to move around in the actual scene/environment to provide improved capture. Thus, rather than a simple image plane indication in the image domain, the image capturing apparatus of FIG. 1 is arranged to derive and present feedback in the real-world/ scene domain. This feedback not only indicates how the image area is extended but also indicates the movement required or desired of the capture unit 101 outside of the image plane.

Specifically, the indication may include an indication of the current pose relative to the set of desired capture poses which is not limited to the image plane itself. Rather, the position indication also includes an indication of how the current position relates to the desired capture poses in a direction which is not in the image plane. Specifically, the indication may indicate how the current pose relates to the desired capture poses in a direction which is perpendicular to the image plane, and thus it may provide feedback on how a user should move the capture unit 101 "into or out of" the image plane. The indication accordingly provides information which can direct the user to complex capture patterns in the real three-dimensional world which may provide a much better three-dimensional capture of the scene.

The position indication may accordingly have a component that indicates a relative position difference between the current pose and at least one desired capture pose in a direction which is not in, or parallel to, the image plane but which has a non-zero projection onto a direction or axis which is perpendicular to the image plane. The indication may thus be indicative of a position difference in the z-direction where the image plane corresponds to the x, y plane of a three-dimensional coordinate system x, y, z.

It should be noted that in some embodiments, the capture unit 101 may be a three-dimensional camera rather than a conventional two-dimensional camera. However, in such cases, the capture unit 101 will still be linked to (typically) one image plane. For example, a ranging 3D camera may provide an output in the form of an image and a corresponding depth map. In this case, the image (and the depth map) will define an image plane. Also, for stereo (or more generally multi-view) cameras, each provided image define an image plane, and indeed typically the image plane for all images provided is the same.

The set of desired capture poses typically reflect a set of poses for which it is desired that an image/capture is performed. Desired capture poses will in the following also be referred to as anchor poses (and similarly desired capture positions/orientations will also be referred to as anchor positions/orientations).

In addition to the display controller 107 generating an indication of e.g. a difference in the current position relative to the next anchor position, it may also generate an indication of the orientation of the current pose relative to the set of desired capture poses, and specifically may generate an indication of the current pose relative to the orientation of the next anchor pose. This may provide improved feedback to the user and may e.g. result in a system that provides feedback and guidance to a user allowing him to perform a capture based on e.g. a pattern of anchor positions with a plurality of anchor orientations for each anchor point. As a result, an efficient capture of a three-dimensional scene can be achieved with the guidance e.g. ensuring that objects are seen from different directions, sufficient coverage of all regions of the scene is achieved etc.

In many embodiments, the image capturing apparatus may further comprise a model processor (not shown) for generating a model of the scene from images captured for (at least some of) the set of desired capture poses. In many embodiments, depth data captured from the set of desired capture poses (and typically associated with the images) may also be used to generate the model. It will be appreciated that any suitable approach for developing such a model may be used and that a number of different approaches are known in the field. The approach may in many embodiments be used to generate an improved model of the scene based on improved captures. The model may subsequently be used e.g. as a basis for a virtual reality application.

In some embodiments, the image capturing apparatus may further comprise an image synthesizer which is arranged to synthesize one or more images for a pose not belonging to the set of desired capture poses from images of the scene for the set of desired capture poses. Thus, the image synthesizer may be arranged to synthesize a new image for a different pose than those for which images have been captured. Such image synthesis may be based on viewpoint shifting algorithms which are well known to the skilled person. The approach may thus provide a particularly efficient approach for capturing a scene such that it can provide a suitable basis for image synthesis by which e.g. images can be generated viewing the scene from all possible poses despite the scene only being captured from a limited set of capture poses.

The capture unit 101, and indeed in many embodiments the whole image capturing apparatus, may be implemented in a handheld device, such as for example a Smartphone or a handheld still or video camera. The approach may advantageously support a capture process wherein a user can simply move a Smartphone/camera around following the guidelines provided by the pose indicators resulting in an effective capture of 3D characteristics of the scene from different and advantageous capture positions.

The image capturing apparatus may in some embodiments also be arranged to dynamically display images captured by the capture unit 101. For example, in some embodiments, the capture unit 101 may provide a streaming capture stream, such as effectively a video signal comprising the dynamically captured images. The display controller 107 may generate a display signal which includes these images thereby providing a real-time image of what is currently captured by the capture unit 101. The display controller 107 may further overlay this real-time image by the pose indication, for example by overlaying the image by one or more arrows indicating the necessary motion required to change the current pose to the next anchor pose. As another example, the display controller 107 may generate a display signal in which the anchor points overlay the image and indicate where in the three-dimensional scene the anchor points are positioned.

However, in many embodiments, the image capturing apparatus is advantageously arranged to not dynamically display the currently captured images. This may for example allow a still image camera to be used rather than a video camera thereby providing higher quality captures. It may further in many embodiments allow a facilitated operation wherein a simple indication, such as one or more arrows, is displayed to the user to provide guidance towards anchor poses.

Figure 2:
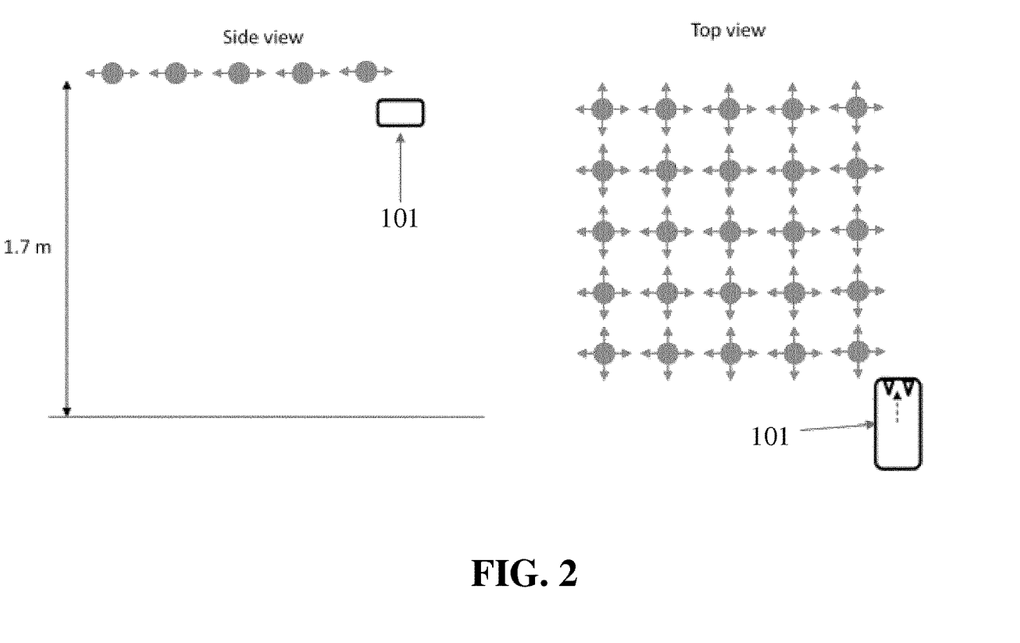
FIG. 2 illustrates an example of a pattern of desired capture poses.

As a specific example of an embodiment, a capture of a scene may be intended to be achieved using a pre-defined grid of anchor positions and with pre-defined anchor orientations for each anchor position. In the example, the grid of virtual cameras form a single horizontal plane above the ground surface. The pattern/grid of poses is illustrated in FIG. 2. In the figure, anchor positions are visualized as spheres/circles with four arrows indicating four horizontal directions/orientations to be captured for each anchor. As shown, the grid may consist of 25 anchor positions with four anchor orientations for each position, resulting in a total of 100 anchor poses. In the example, the grid is a horizontal grid which is approximately at eye height (1.7 m) allowing a user with a handheld device to relatively easily move the device to achieve the desired captures. In the example, the height (e.g. the y direction) is constant for the anchor positions whereas both the sideways (x) and the in/out (z) directions differ for different anchor positions. Similarly, for the orientations, the y component is fixed whereas the x and z directions vary. Indeed, for the orientations, all capture directions are horizontal, and the rotation of the camera is also static (the image is horizontal) so the orientation can be expressed by a single variable, such as specifically the angle with respect to e.g. the x direction. Thus, in the example, the poses can be represented by a pose vector with three components.

In the example, the display of the image capturing apparatus may display an indication to the user that he should move forward (into the image) or backwards (out of the image). At the same time, it can indicate whether the user should move to the right or to the left and additionally whether the user should rotate clockwise or counterclockwise. These indications may be dynamically updated to reflect the current pose of the capture unit 101 and if the user follows the guidance provided, this will guide him to the next anchor pose. When a capture has been executed for this anchor pose, the indication may be changed to be relative to the next uncaptured anchor pose. A user following the guidance will accordingly be led through a capture sequence which will result in a capture from all the desired anchor positions and in all the desired directions.

As another example, the display may present a pattern which continuously indicates where the anchor positions/poses are relative to the camera, e.g. a single circle or sphere may be shown for each anchor position (possibly with arrows extending to show anchor orientations for these). For example, the display controller 107 may effectively generate an overlay or graphic image which shows the positions of the capture positions in the scene as they would be seen from the camera, i.e. for the current camera pose. As the camera is moved, the positions of the pose indicators change to reflect the change in viewpoint resulting in a 3D effect (e.g. parallax) that provides the user with an impression of the anchor position (or pose) in the real 3D space of the scene (effectively virtual 3D position indications are generated). The user may then move the capture unit 101 towards the virtual position indications in order to move to the next anchor pose.

The approach may thus allow for a convenient, yet efficient capture process based on a handheld or user moveable camera. It should be noted that such a capture operation would not be possible using a single multi-camera rig since cameras would occlude the view of other cameras. Sequential scanning of a static scene may provide a practical solution.

Figure 3:
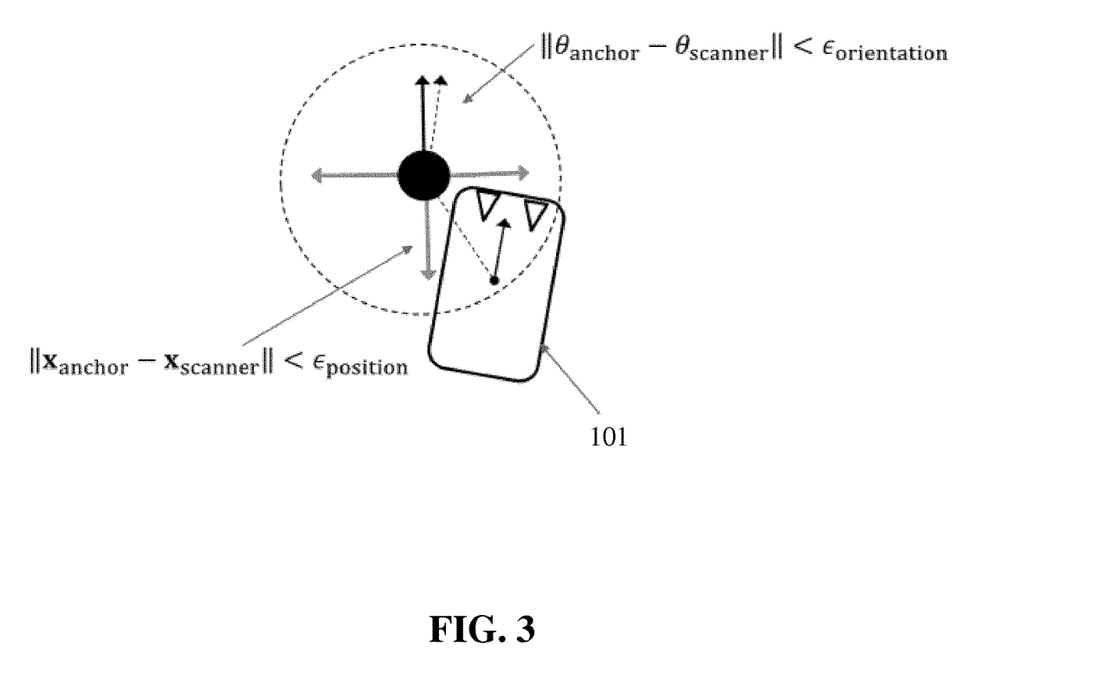
FIG. 3 illustrates an example of determining proximity to a capture pose.

In many embodiments, the image capturing apparatus may be arranged to perform a capture in response to a detection that the current pose is sufficiently close to an uncaptured anchor pose. For example, if the capture unit 101 is detected to be within a given distance and direction of an anchor pose, as illustrated in FIG. 3, an image may automatically be taken and stored for the anchor pose. Visual feedback on the scanned anchor may in some embodiments be provided, e.g. by changing the appearance, e.g. color, of the pose or position indication.

In many embodiments, the display may be a three-dimensional display and the pose indicators may exploit all three dimensions. For example, a three-dimensional arrow may be presented showing the direction to the next anchor point. As another example, the pattern of anchor positions may be shown in three dimensions.

In many embodiments, the display may be a display of an augmented reality headset (e.g. augmented reality glasses or a virtual reality headset). The indication may in such a case be shown relative to the current head orientation. For example, a position of the capture unit 101 relative to the current head position may be shown together with a position of the next anchor point. The user will thus effectively see virtual representations of the capture unit 101 position and the anchor position corresponding to the current head pose, and can accordingly move the capture unit 101 to position this at the capture position.

The approach may thus include visualizing a pre-defined and/or dynamically determined pattern of desired camera locations with orientations on virtual or augmented reality glasses. With such glasses on, a user can now position the camera of the capture unit 101 close to the virtual camera positions. When the camera is within a pre-defined distance and angle from an anchor pose, the camera may automatically take a picture and the corresponding anchor pose indication may change color to indicate that a capture has been performed for this pose and that the operator can proceed to the next anchor pose.

In the previous examples, the set of desired capture poses corresponds to a predetermined set of anchor poses, such as a regular grid or cube of anchor positions with fixed anchor orientations. However, in other embodiments, the image capturing apparatus may be arranged to adapt the set of desired capture poses in response to properties of the scene being captured.

In many embodiments, the pose processor 105 may be coupled to a capture processor 111 which is arranged to determine the set of desired capture poses in response to data captured for the scene. In this way, the set of desired capture poses may be adapted to the characteristics of the specific scene. As a low complexity example, the image capturing apparatus may initially capture a few images from random viewpoints and adjust e.g. the spatial density or the extent of the capture area dependent on a property of the images, such as for example dependent on the degree of variation in the scene.

In many embodiments, the optimal set of anchor poses is adaptively determined to reflect the current conditions.

Specifically, the capture processor 111 may be arranged to determine at least some of the capture poses of the set of desired capture poses in response to data captured for the scene. The data may specifically be light intensity image data and/or depth data (and specifically depth related image data) captured for some capture poses in the set of desired capture poses. Thus, the set of capture poses may be dynamically updated and modified based on the captures made for capture poses that are already included in the set of desired capture poses.

As an example, the capture process may be initialized by a set of predetermined or default capture poses, e.g. the set may be initialized with capture poses corresponding to a regular grid with a given distance between capture poses. Based on this, the capture process may be started with the user being guided to the appropriate poses and with captures accordingly being made. The resulting images may then be processed to e.g. determine depth characteristics for the scene. The light intensity and/or depth may be analysed and based on this analysis the capture processor 111 may e.g. add some capture poses to the set of desired capture poses. For example, if it is found that the capture poses in one region are capturing a part of the scene which is particularly complex (e.g. estimated by this part of the scene having a large depth variation), then the capture processor 111 may add capture poses in that region in order to provide additional data for the part of the scene. For example, it may add capture poses inbetween the existing capture poses.

The adaptation of the set of capture poses may be based on an assessment of how well the scene can be modelled or an image can be synthesized for different viewpoints based on the anchor poses included in the set of anchor poses. If it is estimated that sufficiently accurate synthesis/modelling cannot be achieved, further anchor poses may be included to ensure that this can be achieved. In some embodiments, the capture processor 111 may apply a predetermined pattern, such as a grid system similar to that of FIG. 2, but e.g. vary the size and number of anchor positions included in the grid based on how accurate the resulting modelling/synthesis is assumed to be for this grid. In other embodiments, a local variation of anchor points may be employed wherein a higher spatial concentration/density of anchor points is introduced in areas where the scene is more difficult to model/synthesize than where it is not.

In some embodiments, the assessment of model/synthesis quality may be considered only when initiating the capture process, and an adaptive determination of the set of desired capture poses may be performed only once. In many other embodiments, the set of desired capture poses may be determined adaptively and dynamically during the capture operation, and the set of desired capture poses may be changed in response to the previous captures of the process.

For example, during the capture process, an estimate may be made of how well a given view of a scene can be synthesized from neighboring (captured) views. When this is expected to be achievable with high quality e.g., scene complexity is low or viewpoint interpolation algorithm is efficient, the set of anchor poses may be made less dense in this area, e.g. by removing anchor poses. Conversely, when the quality of the synthesized view is expected to be low, the spatial density of the anchor poses may be maintained or increased, e.g. by adding anchor poses. In this way, the set of anchor poses, and e.g. the corresponding displayed pattern may change during the capturing process.

In many embodiments, the capture processor 111 may perform a fairly complex and accurate analysis of the possible quality. For example, the capture processor 111 may even synthesize views for the same viewpoint from different sets of captures from existing anchor poses and compare the resulting synthesized views. If the views are sufficiently similar, no additional pose is added but if the resulting views differ sufficiently, a new anchor pose corresponding to the viewpoint is added to the set of anchor poses.

In many embodiments, simpler approaches may be used to determine a measure which is suitable for adapting the set of desired capture poses. For example, in many embodiments, a scene complexity measure may be determined in response to data captured for the scene, and the set of desired capture poses may be adapted in response to the complexity measure. Typically, for an increasing complexity of the scene, the capture processor 111 will increase the number/density of anchor poses and for a decreasing complexity of the scene, it will decrease the number/density of anchor poses. Thus, scene complexity is used as a heuristic to estimate how well an actual camera view can be interpolated from neighboring anchor captures.

In many embodiments, the capture processor 111 may be arranged to adapt the set of desired capture poses based on depth data for the scene. Depth data may specifically be a disparity, a z-value or any other value being indicative of a distance from the camera to the object in the scene corresponding to the image position for which the depth value is provided.

Accordingly, in many embodiments, the image capturing apparatus may comprise a depth processor 113 which is arranged to determine depth values for captures of the scene. Thus, for a given capture pose, the depth processor 113 may determine depth values reflecting the distance from the capture unit 101 to the objects of the scene for the given capture pose.

In some embodiments, the depth processor 113 may directly comprise depth measuring functionality, e.g. it may comprise ranging functionality. In other embodiments, the depth processor 113 may be arranged to determine the depth values from e.g. images captured by the capture unit 101. For example, if the capture unit 101 comprises a stereo camera, the depth processor 113 may be arranged to determine depth values from stereo images generated by the capture unit 101 (typically using disparity estimation as will be well known to the skilled person). As another example, if the capture unit 101 comprises a 2D camera, the depth processor 113 may be arranged to determine depth values by comparing images for different poses (again typically based on disparity estimation).

Indeed, whereas the depth processor 113 is illustrated as a separate functional block in FIG. 1, it may often be considered as part of the capture unit 101.

In many embodiments, the capture processor 111 may additionally or alternatively be arranged to adapt the set of desired capture poses based on light field data/image data for the scene. Thus, in many embodiments, the capture processor 111 may consider visual image data.

As an example, a complexity measure for the scene may often be determined based on depth data, image data, or both depth data and image data. For example, if the depth data indicates that there is a large depth variation in the scene with e.g. relatively frequent and relatively steep step changes, it may consider this to be an indication of the scene being complex and requiring a higher spatial density of anchor poses. Similarly, if an image has a large variation in terms of image segments having very different visual properties, this may be seen as an indication of a high complexity of the scene and thus the capture processor 111 may increase the spatial density of the anchor sets (for example if image segmentation has resulted in many relatively small image objects and with these objects having very different colors and/or intensities). In contrast, if the depth and/or visual variation is low, the scene may be considered to have relatively low complexity and the spatial density of anchor poses may be reduced.

The approach may for example reflect that in scenes with a relatively large number of small objects, a higher number of capture poses are typically required than for scenes with few or no objects.

In many embodiments, the data used to adapt the set of desired capture poses may be data captured from existing anchor positions. This may facilitate operation in many embodiments as no additional capture need to be made or processed. It may also in many embodiments provide improved results as it directly reflects the estimated scene properties when viewed from the anchor points.

In some embodiments, the adaptation may be a global adaptation, i.e. if the complexity of a scene increases, the distance between all anchor poses decreases and a larger overall number of anchor poses increases. However, in many embodiments, a more localized effect is employed where only the number of anchor points in a neighborhood of where the data is captured is modified. This may allow a more flexible approach where variations in the complexity of a scene are considered with the density of anchor poses varying to reflect the complexity of the scene.

Figure 4:
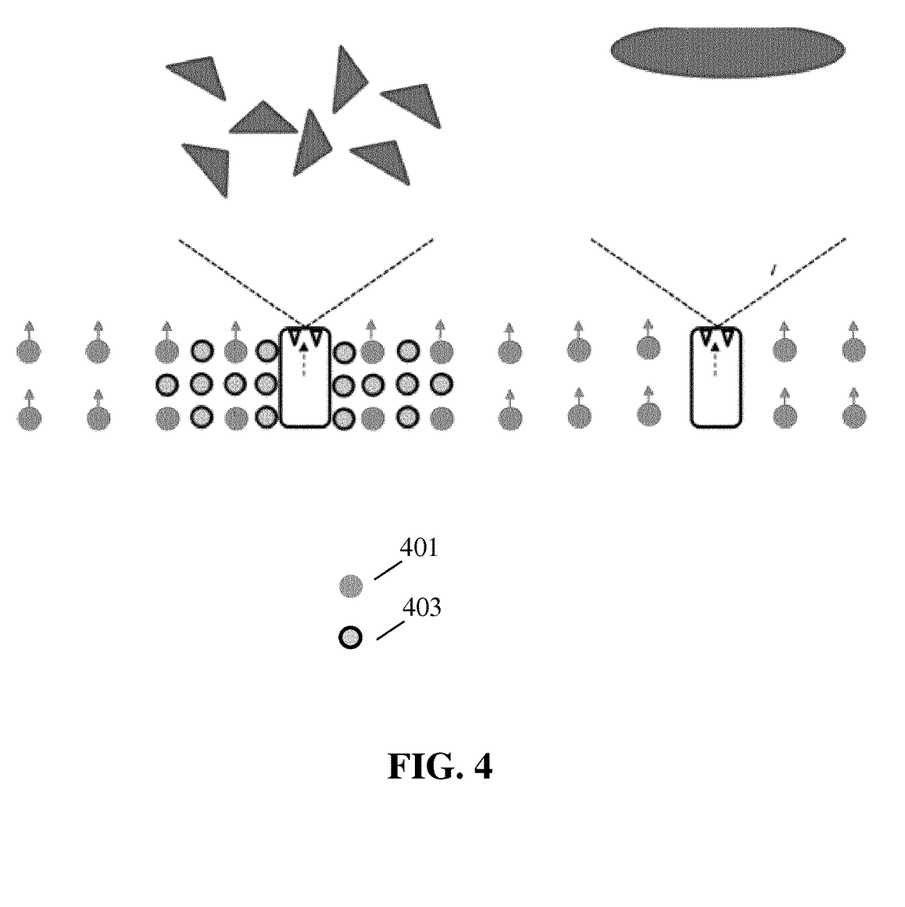
FIG. 4 illustrates an example of adapting a set of desired capture poses in accordance with some embodiments of the invention.

An example of such an approach is illustrated in FIG. 4. The figure shows the capture unit 101 for two different scenes (or at two different positions while trying to capture a scene with the two positions viewing different scene complexities). The right-hand example shows a scenario wherein the scene has a relatively low scene complexity and a predetermined regular grid of anchor poses 401 may be used to capture from this neighborhood. In contrast, the left-hand scenario shows an example wherein the scene has a relatively high complexity, and this has resulted in an increase of the spatial density of the anchor points. In the specific example, this is achieved by adding new anchor poses 403 to the predetermined grid of anchor poses.

The previous examples focused on examples in which the scene complexity and adaptation of the set of desired capture poses was considered for the scene as a whole. However, in many embodiments, the adaptation may be more localized and may vary for different parts of the scene. Thus, the spatial density of anchor positions may be increased in regions where the scene complexity is higher and reduced in regions where the scene complexity is low. FIG. 4 may be considered an example of how the pattern of the anchor poses may be varied for different regions of the scene dependent on the local characteristics, i.e. the two scenarios may reflect different regions/parts of the same scene.

In some embodiments, the capture processor 111 may specifically be arranged to increase the spatial density of desired capture poses in the neighborhood of a first pose in response to data captured at the first pose being indicative of an increasing depth variation and/or to decrease the spatial density in the neighborhood in response to data captured at the first pose being indicative of a decreasing depth variation.

As mentioned previously, a depth variation estimate may be generated which seeks to reflect the presence (or not) of a number of depth transitions corresponding to the presence of a relatively high number of different objects at different depths. This may for example be achieved by identifying segments based on depth transitions in a depth map and then determining how many such segments are found. It will be appreciated that many other approaches may be used for determining suitable depth variation measures.

In some embodiments, the capture processor 111 may be arranged to adapt the set of desired capture poses in response to a measure indicative of an increased roughness of a surface of an object of the scene. For example, the capture processor 111 may identify a specific object (e.g. the largest object) in an image captured by the camera of the capture unit 101 (e.g. based on identification of segments having appropriate characteristics as will be known to the skilled person). The capture processor 111 may then analyze the corresponding section of an associated depth map to determine the depth variation within this area. If the depth variation is relatively low, the surface of the object may be relatively smooth and the object can be accurately represented using fewer anchor poses than if the depth variation is relatively high reflecting an object having a rough surface.

In some embodiments, the capture processor 111 may additionally or alternatively consider how highly textured images, and specifically image segments corresponding to object surfaces, are. For example, the object identified for evaluating how rough the surface is based on the depth data may alternatively or additionally be evaluated using image data. If the object exhibits a high amount of texture variation, this suggests that the object may have a complex, varying surface and accordingly the spatial density of anchor poses may be increased to ensure that the surface is accurately captured. Conversely, if the texture variation is very low, this may indicate a smooth surface and fewer anchor poses may be used.

In some embodiments, the capture processor 111 is arranged to increase the spatial density of desired capture poses in the neighborhood of a first pose in response to data captured at the first pose being indicative of a reduced distance to an object of the scene. Alternatively or typically additionally, the capture processor 111 may be arranged to decrease the spatial density of desired capture poses in the neighborhood of the first pose in response to data captured at the first pose being indicative of an increased distance to an object of the scene.

The scene may specifically be regarded as less complex when objects are relatively far from the camera as this typically provide improved visibility of different aspects and results in less changes when changing view pose. It also tends to result in less occlusion by the object of other parts of the scene. Similarly, the scene may be considered to be more complex when objects are relatively close to the camera as it requires more detailed captures to accurately reflect variations in the object and furthermore results in the object typically occluding a larger part of the scene thereby requiring additional anchor poses to allow de-occlusion.

Increasing and decreasing the spatial density of desired capture poses may for example be achieved as previously mentioned by adding new desired capture poses to an already existing set of desired capture poses and/or by removing new desired capture poses to the already existing set of desired capture poses. This may in many embodiments allow an effective generation of the set of desired capture poses and may advantageously tend to result in variations around a considered nominal set of desired capture poses. For example, experience may indicate that we need to capture a view-point very ½ degree from an object. Knowing the depth to an object then automatically provides the spatial sample spacing of the capture unit. However, the capture processor 111 may modify this to reflect local variations and specifically may add anchor positions where there is a high degree of complexity and remove anchor positions where there is a low degree of complexity. However, as the capturing is based on the predetermined set, the amount of anchor positions that need to be added or removed is often relatively low and a low complexity operation can be achieved. Further, this approach ensures that it is relatively easy to control that the adaptation is not too extreme. For example, it allows easy control to ensure that there are still sufficient anchor positions even for low complexity neighborhoods, and that there are not too many anchor positions even for high complexity neighborhoods.

It will be appreciated that different selection criteria can be used for deciding which capture poses to remove or add. For example, in some embodiments, the capture processor 111 may simply remove every other capture position to reduce the spatial density, or add a new capture position midway existing capture positions to increase the spatial density.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

A term like "in a neighborhood of" will not be an unclear term for any person skilled in the art and an absolute value for such a term cannot be given in general in this patent application as it will unfairly limit the scope of some claims. The skilled person will appreciate that he/she can (and should) freely determine the definition of "neighborhood" realizing that any absolute value is dependent on the desired quality which is the choice of the skilled person designing the inventive image capturing apparatus. The exact selection of the neighborhood will depend on the specific design preferences and requirements of the individual embodiment.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example and shall not be construed as limiting the scope of the claims in any way.

The invention claimed is:

1. An image capturing apparatus comprising:
   a capture circuit, wherein the capture circuit is arranged to capture images of a scene;
   a tracker, wherein the tracker is arranged to dynamically determine poses of the capture circuit;
   a pose processor circuit, wherein the pose processor circuit is arranged to determine a current pose of the capture circuit relative to a set of desired capture poses;
   a display;
   a display controller circuit coupled to the pose processor circuit,
      wherein the display controller circuit is arranged to control for controlling the display to present a current capture pose indication,
      wherein the current capture pose indication comprises an indication of a position of the current pose of the capture circuit relative to the set of desired capture poses in a direction outside an image plane of capture circuit; and
   a capture processor circuit, wherein the capture processor circuit is arranged to determine at least some of the capture poses of the set of desired capture poses in response to data,
      wherein the data is captured for the scene,
      wherein the data comprises depth data.

2. The image capturing apparatus of claim 1,
   wherein the capture processor circuit is arranged to vary a spatial density of desired capture poses in a neighborhood of a first pose in response to first pose data,
   wherein the first pose data is captured at the first pose.

3. The image capturing apparatus of claim 2,
   wherein the capture processor circuit is arranged to increase the spatial density of desired capture poses in the neighborhood of the first pose in response to first pose data,
   wherein the first pose data is indicative of an increasing depth variation.

4. The image capturing apparatus of claim 2,
   wherein the capture processor circuit is arranged to increase the spatial density of desired capture poses in the neighborhood of the first pose in response to first pose data,
   wherein the first pose data is indicative of a reduced distance to an object of the scene.

5. The image capturing apparatus of claim 2,
   wherein the capture processor circuit is arranged to increase the spatial density of desired capture poses in the neighborhood of the first pose in response to first pose data,
   wherein the first pose data is indicative of an increased roughness of a surface of an object of the scene.

6. The image capturing apparatus of claim 1, wherein the capture processor circuit is arranged to increase a spatial density of desired capture poses in a neighborhood of a first pose of the number of poses by adding at least one desired capture pose to a predetermined set of desired capture poses in the neighborhood.

7. The image capturing apparatus of claim 1, wherein the display controller circuit is arranged to control the display to present the current capture pose indication without displaying images currently captured by the capture circuit.

8. The image capturing apparatus of claim 1, wherein the current capture pose indication comprises an indication of an orientation of the capture circuit relative to the set of desired capture poses.

9. The image capturing apparatus of claim 1,
wherein the display is a three-dimensional display,
wherein the current capture pose indication is a three-dimensional indication of a direction to a pose of the set of desired capture poses.

10. The image capturing apparatus of claim 1,
wherein the display is a display of an augmented reality headset,
wherein the current capture pose indication is indicative of a position of a desired capture pose relative to a position of the current pose.

11. The image capturing apparatus of claim 1, wherein the capture circuit is a portion of a handheld device.

12. The image capturing apparatus of claim 1, further comprising at least one of:
an image synthesizer,
wherein the image synthesizer is arranged to synthesize an image for a synthesized pose,
wherein the synthesized pose does not belong to the set of desired capture poses,
wherein the synthesized pose is created from images of the scene for the set of desired capture poses; and
a model processor circuit, wherein the model processor circuit is arranged to generate a model of the scene,
wherein the model of the scene is created from images of the scene for the set of desired capture poses.

13. A method of image capturing comprising:
dynamically determining poses of a capture circuit capable of capturing images of a scene;
determining a current pose of the capture circuit relative to a set of desired capture poses;
controlling a display to present a current capture pose indication, wherein the current capture pose indication comprising an indication of a position of the current pose of the capture circuit relative to the set of desired capture poses in a direction outside an image plane of the capture circuit;
capturing images of a scene; and
determining at least some of the capture poses of the set of desired capture poses in response to data,
wherein the data is captured for the scene,
wherein the data comprises depth data.

14. The method of claim 13, further comprising varying a spatial density of desired capture poses in a neighborhood of a first pose in response to first pose data.

15. The method of claim 13, further comprising increasing the spatial density of desired capture poses in the neighborhood of the first pose in response to first pose data, wherein the first pose data is indicative of an increasing depth variation.

16. The method of claim 13, further comprising increasing the spatial density of desired capture poses in the neighborhood of the first pose in response to first pose data, wherein first pose data is indicative of a reduced distance to an object of the scene.

17. The method of claim 13, further comprising increasing the spatial density of desired capture poses in the neighborhood of the first pose in response to first pose data, wherein the first pose data is indicative of an increased roughness of a surface of an object of the scene.

18. A computer program stored on a non-transitory medium, wherein the computer program when executed on a processor performs the method as claimed in claim 13.

19. An image capturing apparatus comprising:
a capture circuit, wherein the capture circuit is arranged to capture images of a scene;
a tracker, wherein the tracker is arranged to dynamically determine poses of the capture circuit;
a pose processor circuit, wherein the pose processor circuit is arranged to determine a current pose of the capture circuit relative to a set of desired capture poses;
a display;
a display controller circuit coupled to the pose processor circuit,
wherein the display controller circuit is arranged to control for controlling the display to present a current capture pose indication,
wherein the current capture pose indication comprises an indication of a position of the current pose of the capture circuit relative to the set of desired capture poses in a direction outside an image plane of capture circuit; and
a capture processor circuit, wherein the capture processor circuit is arranged to determine at least some of the capture poses of the set of desired capture poses in response to data,
wherein the data is captured for the scene,
wherein the display controller circuit is arranged to control the display to present the current capture pose indication without displaying images currently captured by the capture circuit.

20. A method of image capturing comprising:
dynamically determining poses of a capture circuit capable of capturing images of a scene;
determining a current pose of the capture circuit relative to a set of desired capture poses;
controlling a display to present a current capture pose indication, wherein the current capture pose indication comprising an indication of a position of the current pose of the capture circuit relative to the set of desired capture poses in a direction outside an image plane of the capture circuit;
capturing images of a scene;
determining at least some of the capture poses of the set of desired capture poses in response to data,
wherein the data is captured for the scene; and
presenting the current capture pose indication without displaying images currently captured by the capture circuit.

* * * * *